US010409929B2

(12) United States Patent
Johansen

(10) Patent No.: US 10,409,929 B2
(45) Date of Patent: Sep. 10, 2019

(54) METHOD FOR SIMULATION OF MULTIPHASE FLUID FLOW IN PIPELINES

(71) Applicant: Ledaflow Technologies DA, Trondheim (NO)

(72) Inventor: Stein Tore Johansen, Ranheim (NO)

(73) Assignee: Ledaflow Technologies DA, Trondheim (NO)

( * ) Notice: Subject to any disclaimer, the term of this patent is extended or adjusted under 35 U.S.C. 154(b) by 415 days.

(21) Appl. No.: 14/647,068

(22) PCT Filed: Nov. 21, 2013

(86) PCT No.: PCT/EP2013/074381
§ 371 (c)(1),
(2) Date: May 22, 2015

(87) PCT Pub. No.: WO2014/082916
PCT Pub. Date: Jun. 5, 2014

(65) Prior Publication Data
US 2015/0286755 A1   Oct. 8, 2015

(30) Foreign Application Priority Data

Nov. 27, 2012   (NO) .................................... 20121424

(51) Int. Cl.
*G06F 17/50* (2006.01)
*G06F 17/16* (2006.01)

(52) U.S. Cl.
CPC .......... *G06F 17/5009* (2013.01); *G06F 17/16* (2013.01); *G06F 2217/16* (2013.01); *G06F 2217/34* (2013.01)

(58) Field of Classification Search
CPC .. G06F 17/5009; G06F 17/16; G06F 2217/34; G06F 2217/16
See application file for complete search history.

(56) References Cited

U.S. PATENT DOCUMENTS 5,550,761 A * 8/1996 Pauchon ................ G05B 17/02
                                                        703/6
6,502,465 B1 * 1/2003 Vedapuri .................. G01F 1/66
                                                        73/861.04

(Continued)

OTHER PUBLICATIONS

MultiphaseFlowHandbook by Loth et al Chapter13; Year 2006, pp. 158 (Year: 2006).*

(Continued)

*Primary Examiner* — Akash Saxena
(74) *Attorney, Agent, or Firm* — Kilpatrick Townsend & Stockton LLP

(57) ABSTRACT

This invention relates to a method for one dimensional simulation of multiphase fluid flow in pipelines enabling determination of pressure drop, fluid volume fractions, and heat and mass transfer coefficients in multiphase pipeline flows, wherein the method comprises providing real world values of the superficial velocities of each of the continuous fluid phases, the pipe diameter, and the inclination angle of the pipeline relative to the horizontal plane, providing initial values describing the flow geometry of the multiphase flow, where the initial values at least comprises the axial pressure gradient and the positions of the large scale interfaces separating the continuous fluid phases, employing a one-dimensional numerical model based on Eulerian formulated transport equations of the multiphase flow in the pipeline, solving the numerical model with the set of input values from step a) and b) to determine the flow parameters of the multiphase flow, and displaying one or more of the determined flow parameters.

13 Claims, 9 Drawing Sheets

(56) References Cited

U.S. PATENT DOCUMENTS

Figure 1:
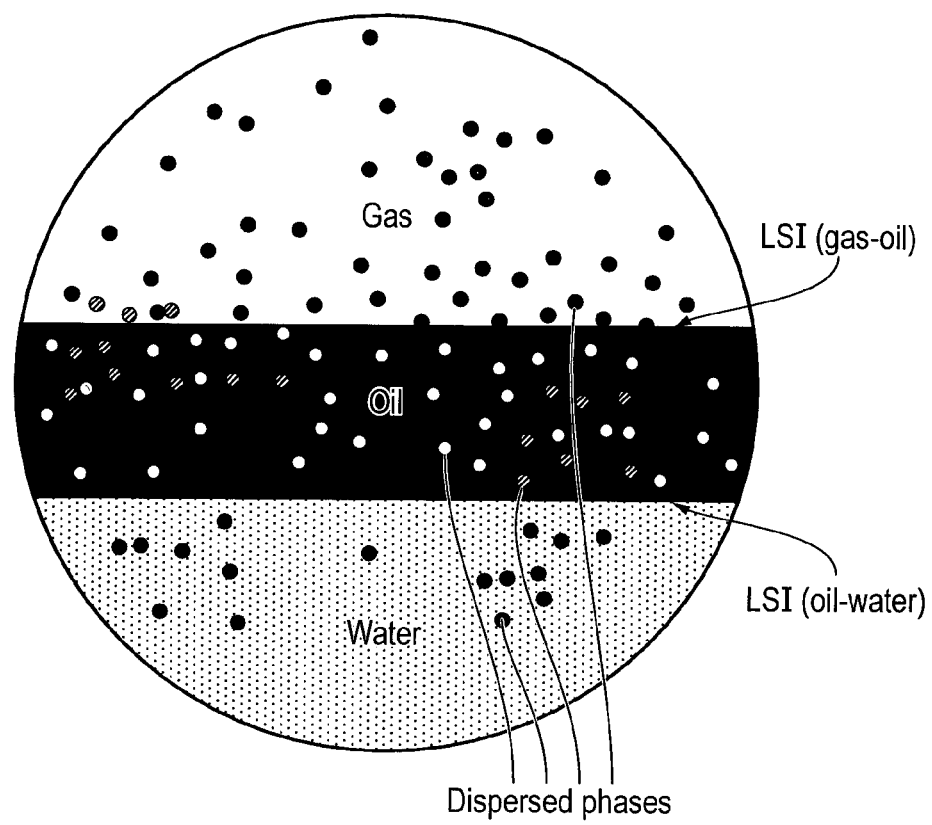

| | | | | |
|---|---|---|---|---|
| 7,172,020 B2* | 2/2007 | Tseytlin | | E21B 43/12 |
| | | | | 166/250.07 |
| 7,610,183 B2* | 10/2009 | Danko | | G06F 17/13 |
| | | | | 703/2 |
| 9,540,911 B2* | 1/2017 | Stone | | E21B 43/00 |
| 10,280,722 B2* | 5/2019 | Bello | | E21B 43/14 |
| 2004/0084180 A1* | 5/2004 | Shah | | E21B 47/10 |
| | | | | 166/250.16 |
| 2005/0267718 A1* | 12/2005 | Guyaguler | | E21B 43/00 |
| | | | | 703/10 |
| 2006/0041382 A1* | 2/2006 | Faur | | G01F 1/74 |
| | | | | 702/6 |
| 2006/0265169 A1* | 11/2006 | Breister | | G06F 17/5018 |
| | | | | 702/100 |
| 2007/0073527 A1* | 3/2007 | Flandrin | | G06T 17/20 |
| | | | | 703/10 |
| 2008/0178936 A1* | 7/2008 | Seeli | | F17D 1/005 |
| | | | | 137/2 |
| 2009/0126502 A1* | 5/2009 | Wee | | G01F 1/44 |
| | | | | 73/861.04 |
| 2011/0144965 A1* | 6/2011 | Rossi | | E21B 43/00 |
| | | | | 703/10 |
| 2011/0320047 A1* | 12/2011 | Stone | | E21B 43/00 |
| | | | | 700/282 |
| 2012/0278053 A1* | 11/2012 | Garcia | | E21B 43/00 |
| | | | | 703/10 |
| 2013/0103370 A1* | 4/2013 | Barley | | G06F 17/5009 |
| | | | | 703/2 |
| 2013/0317791 A1* | 11/2013 | Danielson | | G06F 17/5009 |
| | | | | 703/2 |
| 2015/0286755 A1* | 10/2015 | Johansen | | G06F 17/5009 |
| | | | | 703/2 |
| 2016/0063146 A1* | 3/2016 | Bailey | | G06F 17/10 |
| | | | | 703/2 |
| 2017/0364616 A1* | 12/2017 | Lukyanov | | G06F 17/5018 |

OTHER PUBLICATIONS

Laux, H. et al., "Simulation of multiphase flows composed of large scale interfaces and dispersed fields", Conference Info: Proceedings of the 6$^{th}$ International Conference on Multiphase Flow, ICMF 2007, Leipzig, Germany, Jul. 9-13, 2007.

De Sampaio, P.A.B., et al.: "Modelling of stratified gas-liquid two-phase flow in horizontal circular pipes," International Journal of Heat and Mass Transfer, Pergamon Press, GB, vol. 51, No. 11-12, Jun. 1, 2008.

Laux, H. et al., "Multi-dimensional simulations of slug and slug-like flows in inclined pages and channels", BHR Group 6$^{th}$ North American Conference on Multiphase Technology; 20080604 to 20080606; BANFF, AB, USA, The Fluid Engineering Centre, UK, Jan. 1, 2008.

International Search Report and Written Opinion corresponding to PCT/EP2013/074381 dated Feb. 2, 2014, 12 pages.

* cited by examiner

METHOD FOR SIMULATION OF MULTIPHASE FLUID FLOW IN PIPELINES

FIELD OF INVENTION

This invention relates to a method for simulation of multiphase fluid flow in pipelines enabling determination of pressure drop, fluid volume fractions, and heat and mass transfer coefficients in multiphase pipeline flows. The invention may, based on a quasi-steady state assumption (snap shot of a transient multiphase flow), predict velocity profiles, volume fractions, particle or bubble size, and wall shear stresses, for all fields in the pipe cross section. The flow may be composed of any number of continuous and dispersed fields and phases.

BACKGROUND

Multiphase flow occurs when more or less separate phases of gases, liquids and/or solid particles flow simultaneously as a mixture. Multiphase flow may involve complex irregular interactions between the flowing phases inducing pressure drops, deposits, liquid accumulation and unstable flows. These phenomena may occur in a wide range of applications ranging from large scale industrial processes such as i.e. pharmaceutical industry, paper industry, food industry, metallurgical industry, to small scale applications such as i.e. cooling systems, combustion engines etc.

One particular area where understanding and managing multiphase flow is of vital importance is transportation of hydrocarbons in pipelines from the production sites to processing plants. Fluid flow in pipelines from oil- and gas fields typically involves simultaneous flow of water, oil, and gas, and may also contain entrained solids. The flow patterns may take many different regimes, such as slug flow, bubbly flow, stratified flow, annular flow, and/or churn flow.

The present development of oil- and gas extraction is towards more technically challenging areas such as the arctic and deep water and also in the marginal fields in harsh environments. It has thus become more important to understand and predict possible multiphase behaviour and complex fluid-related effects which may occur in the pipelines during design and operation of oil- and gas transportation lines. The basic objective for operators is optimized production under optimized safety-conditions, resulting in a need for controlling the flow velocities, pressure variations and fluid temperatures in the pipelines.

The irregular and complex behaviour of multiphase flow makes it necessary to use numerical simulations, often assisted by extensive experimentally determined flow parameters, to predict and/or to obtain an understanding of the multiphase behaviour and complex fluid-related effects that may be expected to occur in a specific pipeline.

PRIOR ART

Numerical models for simulating fluid flows typically employ an Eulerian framework for solving the continuous phases of multiphase flows, and they may grossly be considered as two classes of models; separate flow models and models for dispersed flow.

Separate flow models usually treat the different fluid phases as completely separated by a sharp interface between the fluid phases. Among such models are known free surface models which keep track of the interface by use of a reference field which moves with the interface. However, surface models cannot handle flows where the interface folds, breaks or merges.

Another approach is the volume of fluid method (VOF) where each fluid phase is modelled by formulating local conservation equations for mass, momentum and energy and replacing the jump conditions at the interface by smoothly varying volumetric forces. This allows tracking of the complicated movement and folding of the interface indirectly by tracking the motion of each of the fluid phases and then determining the interface position as a function of time from the volumetric fluid fractions resulting from the movement of all fluid phases. The VOF approach is thus able to handle flows where the interface folds, breaks or merges. An example of such models is described in U.S. Pat. No. 7,379,852, which discloses a method for tracking a number N of fluid materials and their associated interfaces during simulated fluid flow by use of a microgrid cell methodology which is embedded on a regular macrogrid to subdivide and then tag fluid materials in a computational system preferably using a prime numbering algorithm. The motion of microgrid cells is tracked based on local velocity conditions, rectifying small anomalies by a coupled evaluation of local volume fraction fields and global mass conservation. Volume fractions can be calculated at any time step via an evaluation of the prime locations so that average cellular density and viscosity values can be regularly updated.

The numerical workload enhances considerably for each fluid phase of which the interface needs to be tracked and determined. Thus, separate flow models may handle only a relatively small number of fluid phases. Therefore, it is necessary to employ another approach for handling dispersed flow where there may be a very large number of relatively small and locally varying distribution of fluid phases entrained in a continuous main fluid phase. A non-exhaustive list of examples of dispersed flows include bubble flow where a gas phase is distributed as bubbles in a liquid phase, mist flow where small droplets of a liquid phase are distributed in a gas phase, emulsions where small droplets of a liquid phase is distributed in a main liquid phase, slurries where small solid particles are distributed in a liquid phase, and any conceivable mixture of these.

In order to handle large number of relatively small phases distributed in a major continuous phase, the models for dispersed flow abandon the concept of tracking the interfaces separating the fluid phases and instead treat the different fluid phases as an interpenetrating continuum associated with discrete entrained particles, bubbles or droplets. Thus, in this approach, the discrete character of the multiphase flow is averaged out such that the small scale fluid movements around individual particles, bubbles, or droplets, or the trajectory of these individual particles, bubbles, or droplet are ignored. The concentration files in these models will typically vary smoothly in space. Dispersed flow models are incapable of handling flows significantly influenced by effects from the interfaces separating the fluid phases.

However, multiphase flows in many industrial applications involve large scale features co-existing with dispersed particles/bubbles or droplets. These multiphase flow situations require the capability of simulating both separated flow situations and dispersed flow situations.

U.S. Pat. No. 5,550,761 discloses a modelling method which differentiates these two types of flow patterns: separated flow patterns (stratified or annular) and dispersed flow patterns, and which treats intermittent flow patterns (slug, churn flow) as a combination of them. This is obtained by characterising the flow regimes by a parameter 13 representing the fraction of a flow in a separated state, the parameter ranges continuously from 0 for dispersed flow regimes to 1 for separated flow regimes and then apply a transition algorithm for determining whether the flow should be treated as separated, intermittent or dispersed.

Another approach is presented in Laux et al. (2005) [1]. This document discloses a hybrid approach for a two-phase flow in pipes, where a multi-level approach is employed to avoid being limited by the direct simulation technique of resolving all interfaces. The two-phase flow is divided into a set of fields which usually are: a continuous liquid layer, a continuous gaseous layer, bubbles suspended in the continuous liquid layer, and droplets suspended in the continuous gas layer. A set of Eulerian volume and ensemble averaged turbulent transport equations are then derived for each field. That is, each field is treated as an interpenetrating continuum in accordance with the dispersed flow approach except for the two major continuous fluid phases (liquid and gas). These two phases are treated as two distinctly separated phases in accordance with the volume of fluid approach. The interface separating these two major phases is also the major interface of the flow, and is thus often denoted the large-scale interface (LSI) in the literature.

The approach of [1] is thus a hybrid approach simultaneously employing both the dispersed flow approach to handle suspended droplets, particles and/or bubbles, and the separated flow approach for keeping track of the interface separating the continuous major fluid phases. In accordance with conventional VOF models, the hybrid approach of [1] employs local model descriptions to represent smoothly varying volumetric forces across the large-scale interface and indirectly determines the position of the interface. The shear forces across the interface are i.e. approximated by using wall functions for rough walls. The large-scale interface is also made responsible for delivering droplets and bubbles to the respective continuous major fluid phases.

In another publication, Laux et al. (2007) [2] give more technical details on the approach presented in [1].

Transient three-dimensional simulations of multiphase flows in pipelines involve huge amounts of computational time and results in much more information than needed for understanding and predicting developed multiphase flow in straight pipe segments. In such cases the multiphase flow may be approximated by assuming being fully developed, i.e. having no axial gradients in velocities and volume fractions of the fluid phases. It is thus known, to save computational time and efforts, to employ zero-dimensional point models where the conservation equations which govern the flow are integrated over the full pipe cross section, assuming the flow geometry (spatial phase distribution) is known. The zero-dimensional point model is further based on using ensemble averaging of the 1D model equations. The result is a steady state model that gives the pressure drop and liquid-fractions for given fluid properties, flow conditions and pipe geometry. Examples of zero-dimensional point models are the LedaFlow® PointModel, provided by Kongsberg, or OLGAS®, provided by the SPT-group.

OBJECTIVE OF THE INVENTION

The main objective of the invention is to provide a robust method for one-dimensional simulation of multiphase fluid flow in pipelines enabling determination of pressure drop, fluid volume fractions, and heat and mass transfer coefficients in multiphase pipeline flows.

Another objective of the invention is to provide a robust method for one-dimensional simulation of multiphase fluid flow in pipelines which may be used to directly couple one-dimensional transient models and three-dimensional or quasi three-dimensional models, enabling transient simulation of pipelines flow with more complex geometries.

A further objective is to provide a robust method for one-dimensional simulation of multiphase fluid flow in pipelines which, based on a quasi-steady assumption, enables predicting profiles of velocity, volume fractions, particle or bubble size, and/or wall shear stresses, for all fields in the pipe cross section for flows composed of any number of continuous and dispersed fields and phases.

DESCRIPTION OF THE INVENTION

The present invention is based on the realisation that a simple and cost effective method for determining multiphase flows in pipelines, and which provides more information of the flow parameters than conventional 0D- or 1D-models, may be obtained by assuming 1) that the flow is fully developed and 2) that the flow geometry and the axial pressure gradient of the multiphase flow are known and then employing these assumptions as input in an Eulerian formulated transport equation based model over a vertical cross-section of the pipeline to determine characteristic flow parameters of the multiphase flow.

Thus in a first aspect, the present invention relates to a method for determination of flow parameters of a multiphase flow in a pipeline, where the multiphase flow comprises a plurality of stratified continuous fluid phases separated by large scale interfaces, wherein the method comprises:
a) providing estimated or measured input values describing the pipe diameter and the inclination angle of the pipeline relative to the horizontal plane,
b) providing estimated or measured input values describing the axial pressure gradient and the flow geometry of the multiphase flow, where the estimated or measured input values of the flow geometry at least comprises the positions of the large scale interfaces separating the continuous fluid phases,
c) employing a numerical model based on Eulerian formulated transport equations of the multiphase flow over a vertical cross-section of the pipeline, and
d) solving the numerical model with the set of input values from step a) and b) to determine one or more of the flow parameters of the multiphase flow selected from of the list comprising; profiles of phase- and field velocities, profiles of phase- and field volume fractions, profiles of field droplet- and bubble sizes, and phase- and field superficial velocities.

The flow parameters may be transmitted to a displaying device for visual representation, transmitted to a computer data storage device for later use, or transmitted to a computer memory device for use as input values for other numerical models for determination of multiphase fluid flows, such as i.e. three-dimensional models. The flow parameters of multiphase flow which may be determined by the first aspect of the invention, may in addition to the parameters listed in point d) above, also include one or more of the following characteristic fluid flow parameters; fluid volume fractions, heat- and mass transfer coefficients, averaged particle or bubble sizes, walls shear stresses. The list of specified flow parameters is not exhaustive; any other known or conceivable flow parameter which may be extracted from numerical determination of fluid flows by models based on Eulerian formulated transport equations may also be included. If the method is to be employed for determination of heat transfer coefficients, it may be necessary to feed in real world values of the bulk fluid temperature and the pipe wall temperature in step a).

The first aspect of the invention represents a different approach than usually found in the prior art by taking the estimated or measured input values describing the axial pressure gradient and the flow geometry of the multiphase flow as an input value from which the flow parameters are determined. Conventional models usually take the opposite approach by employing input values describing physical characteristics of the multiphase flow, such as i.e. temperature, flow volumes, pipe geometry etc. to determine the axial pressure gradient and the flow geometry of the multiphase flow. However, by assuming these parameters to be known, the present invention according to the first aspect provides an efficient method based on numerical modelling, but which requires relatively small computer run-times and computer memory capacities, for determining a wide range of characteristic flow parameters of multi-phase flows in pipelines which surpasses the flow parameters provided by comparable prior art numerical models. Both the first aspect and the below given second aspect of the invention is well suited for pipeline operators for more or less real-time trouble-shooting in operation of the pipelines, by using holdups and pressure drops from standard zero-dimensional multiphase point models as input, and thereby obtaining information about droplet wetting of the top of the pipe, and the liquid water distribution (both important to corrosion) etc., and is also suited for being implemented in or coupled to more advanced numerical models for determining fluid flows in pipelines.

The invention according to the first aspect may also be applied to determine the axial pressure gradient and the flow geometry of the multiphase flow if the real world superficial velocities of each of the fluid phases in the multiphase fluid flow are known. In this case they may be applied as reference values for refining the solution of the first aspect. The superficial velocity of a fluid phase is the flow volume rate of the actual fluid phase per pipe cross section in the actual pipeline. This may be obtained by performing a numerical perturbation of the input values for the flow geometry and the axial pressure gradient to form a set of numerically perturbed input values, solving the numerical model for each of the numerically perturbed input values to form a set of virtual superficial velocities, apply the set of virtual superficial velocities and set of numerically perturbed input values to determine the relationship between numerically perturbed input values and the resulting virtual superficial velocities to determine the specific flow geometry values and axial pressure gradient which correspond to the real world values of the superficial velocities of the fluid phases, and then perform a last solution of the numerical model with these flow geometry and pressure gradient values.

Thus, in a second aspect, the invention relates to a method for determining flow parameters of a multiphase flows in a pipeline, wherein the method additionally comprises the following steps in the method of the first aspect of the invention:

d1) providing real world values of the superficial velocities of each of the fluid phases,
d2) employing numerical perturbation on the axial pressure gradient and the flow geometry values of the multiphase flow from step b) to form a set of numerically perturbed input values,
d3) solving the numerical model with the input values from step a) and each of the numerically perturbed input values in the set of step d2) to obtain a set of virtual superficial velocities,
d4) forming a Jacobian matrix from the set of numerically perturbed input values of step d2) and the set of virtual superficial velocities from step d3), and employing the Jacobian matrix to determine the relationship between the numerically perturbed input values and superficial velocities of the fluid phases,
d5) employing the determined relationship from step d4) to determine the specific axial pressure gradient and flow geometry values which correspond to the real world values of the superficial velocities from step d1), and
d6) employing the specific axial pressure gradient and flow geometry values from step d5) as input values in step b) and then performing step c) and d).

By this refinement of the solution, the method according to the first aspect of the inventions enables overcoming a well known shortcoming of one-dimensional models of being dependent upon knowing the flow geometry (location of the large scale interfaces) in advance to be able to determine spatial distributions of variables such as phase velocities, volume fractions (location of large scale interfaces) and bubble and droplet sizes. This shortcoming is overcome by the present invention by employing numerical perturbation on an initial guess or estimation of the flow geometry parameters and using these numerically perturbed parameters as input in a series of computations on an Euler-based one-dimensional model to define the Jacobian matrix which establishes the relationship between the flow geometry (and axial pressure gradient) and the volume flow rates of each continuous phase (i.e. the superficial velocities). Then the Jacobian matrix may be applied to estimate the correct flow geometry from measured or otherwise provided knowledge of the actual flow volume rates of the phases in the multiphase pipeline flow, and then apply the correct flow geometry and pressure as input to the first aspect of the invention to numerically determine a wide range of multiphase fluid flow parameters with an increased accuracy and reliability. In this manner the invention allows using the simple and computational effective approach of the one-dimensional models to obtain a result with a level of information comparable to the larger and more complex three-dimensional models.

The latter approach including the refinement of the solution enabling employing one-dimensional model for determination of the multiphase flow without knowing the flow geometry and pressure gradient in advance, will be denoted as the "one-dimensional point model approach" in the following. The distinction between a one-dimensional model approach and a one-dimensional point model approach, is that the one-dimensional model approach employs a 1D-numerical model directly to determine the flow parameters from a given set of flow geometry values (such as i.e. positions of the large scale interfaces) and the axial pressure gradient, while the one-dimensional point model approach includes the numerical perturbation and the Jacobi-matrix to refine the flow parameters and thus allowing determination of the pressure drop and hold-up (determination of LSI-positions) from the real world superficial velocities. In general, the concept of a one-dimensional model approach is suited when the solution is to be applied as input to other (usually more advanced) numerical models, while the one-dimensional point model approach is better suited as a stand-alone tool for determination of multiphase flows.

The method may further include a verification of the solution and/or increased refinement of the solution according to the second aspect of the invention by inserting after step d6) the additional steps:

d6-1) comparing the estimate of the real world superficial velocities obtained in step d6) with the provided real world values of the superficial velocities from step d1) and determine the absolute value of the difference between them, and if the difference between the estimated and provided real world values of the superficial velocities are larger than the cut-off criteria, set the obtained flow geometry values and axial pressure gradient from step d5) as new initial values of the flow geometry and repeat steps c) to d6-1), or if the difference between the estimated and provided real world values of the superficial velocities is smaller than the cut-off criteria, proceed to step e).

This feature of verification of the solution and the possibility of refining the result may be advantageous in cases with predicting multiphase flows with several fluid phases.

The initial flow geometry values are those values representing the physical distribution and properties of the fluid phases in the pipeline. When applying the first aspect of the invention, it is necessary to assume the flow geometry and the axial pressure gradient to be known. These flow geometry values usually include the location of the large scale interfaces separating adjacent stratified layers of the continuous fluid phases in the multiphase flow, but may also include initial values of the turbulence fields and dispersed field sizes. These initial values of the flow geometry and the axial pressure gradient may be provided either as an output from an external model determination of the multiphase flow or by simply making an initial guess of these values.

The determination of the specific flow geometry values and axial pressure gradient from the Jacobian matrix may be obtained by employing the matrix to form a set of algebraic linear equations relating the flow geometry values and the axial pressure gradient to the set of virtual superficial velocities. Then the determination of the specific flow geometry values and axial pressure gradient which correspond to the real world values of the superficial velocities may be obtained by employing these set of linear equations. The Jacobian matrix may include the initial value of the flow geometry values and axial pressure gradient and the corresponding estimated virtual superficial flow velocities.

The real world superficial velocities may simply be a chosen specification representing an intended transport capacity of a specific pipeline. This may apply in cases where the invention according to the second aspect of the invention is to be used as i.e. a tool for designing and construction engineering of pipelines. It is also possible to employ the invention according to the second aspect of the invention to regulate the operation of a pipeline and/or to troubleshooting in case of reported hold-ups in the pipeline by feeding in measured flow volumes of each the continuous fluid phases (which are proportional to the superficial velocities) and employing the invention to determine where hold-ups are to be expected etc. as information of how to regulate the multiphase feed into the pipeline.

The method according to the first aspect of the invention is not tied to a specific one-dimensional model, but may apply known or conceivable one-dimensional numerical model based on the assumptions that the flow is fully developed in time with no axial gradients in velocities and local volume fractions, and that the flow is stratified having distinct horizontally oriented fluid layers due the gravitational effect on fluids with different densities.

In one embodiment, the method according to the first aspect of the invention may include a specific method for finding the wall distance for the application of wall functions to determine the wall shear stress: The radial velocity distribution in a single phase pipe flow can be reconstructed accurately by using well established wall functions; see i.e. Ashrafian & Johansen (2007) [3]. After the pipe cross section has been cut into a set of vertical slices we use the velocity distribution given by the wall function to compute the slice averaged velocity. This is done for a significant range of flow Reynolds numbers, and slice thicknesses versus pipe diameter. Based on the slice averaged velocity and the known wall shear stress we can find the wall distance, which when put into the wall function give the now known slice averaged velocity. This method allows to find a model for a wall distance as function of i) Reynolds number, ii) relative slice thickness and iii) slice distance from the lower wall, which when used in the conjunction with the wall function will return a constant distribution of wall shear stresses along the pipe perimeter. By applying the model for the wall distance, worked out based on this procedure, we can now relate the mean velocity in each slice to the wall shear stress in the actual slice.

The method for finding the wall distance may in one example embodiment comprise determining the distances to the pipeline wall for each stratified continuous fluid phase of the multiphase flow being applied in the numerical computations by:

employing an estimated or measured wall shear stress value and the wall function to determine the velocity profile for each of the stratified continuous fluid phases across the vertical cross-section of the pipeline, determining an averaged flow velocity for each of the stratified continuous fluid phases across the vertical cross-section of the pipeline by integration over the cross-sectional area of the stratified continuous fluid phase, and applying the averaged flow velocity for each of the stratified continuous fluid phases and the wall function to determine the distance to the wall being applied in the computation of the wall shear stresses in the Eulerian formulated transport equations for each of the stratified continuous fluid phases.

In an other example embodiment, the method for finding the wall distance may comprise, after dividing the cross-section area of the pipeline into a number of n discrete horizontally oriented slices by defining a set of n−1 horizontally oriented parallel grid lines spaced a vertical distance apart from each other, where n is an integer from 2 to 1000, and defining the position of the nearest lying grid line of each of the large scale interfaces to be the same as the position of the respective large scale interface, determining the distances to the pipeline wall being applied in the computation of the wall shear stresses in the Eulerian formulated transport equations by the method of the above example embodiment for each of the discrete horizontally oriented slices.

However, an advantageous example embodiment of a one-dimensional model well suited for the first and second aspect of the invention is a one-dimensional slice averaged cross-sectional profile model where the flow in the slice is described by first setting up two-dimensional ensemble averaged flow equations describing the fully developed 2-dimensional flow in a the cross-section of the slice, and then averaging them over the width of the pipe to form a one-dimensional representation providing vertical (in the gravity direction) profiles of velocities, volume fractions and other relevant field variables. These may subsequently be employed as input to solve the ensemble averaged flow equations in the vertical direction to establish the relation between fluid phase flow rates, fluid properties, pipe geometry, pipe inclination and pressure gradient.

This example embodiment may provide one or more of the following predicted flow parameters for the individual phases and fields of the multiphase flow; wall shear stresses, volume fractions, droplet sizes, bubble sizes, turbulent energy, turbulent length scales, heat transfer coefficients, mass transfer coefficients, etc., and may be formed by i.e.:

- dividing the cross-section area of the pipeline into a number of n discrete horizontally oriented slices by defining a set of n−1 horizontally oriented parallel grid lines spaced a vertical distance apart from each other, where n is an integer from 2 to 1000,
- defining the position of the nearest lying grid line of each of the large scale interfaces to be the same as the position of the respective large scale interface,
- defining, for each of the n slices, a set of ensemble averaged two-dimensional Eulerian formulated transport equations for conservation of mass, momentum, turbulence fields, energy, and size of the dispersed field phases for both the continuous phase and each dispersed field in the continuous phase of the n'th slice,
- averaging the two-dimensional Eulerian formulated transport equations for each of the n slices in horizontal direction over the width of the n'th slice to provide one-dimensional Eulerian formulated transport equations for each of the n slices, and
- closing the one-dimensional Eulerian formulated transport equations by coupling field values for each of the n slices to pipeline wall boundary conditions and the value of the corresponding field value of the neighbouring slice, determining, for each of the large scale interfaces, the fluxes of mass, momentum and energy across the large scale interface by employing standard wall functions and relating these fluxes to the field values of the slices on both sides of the large scale interface, and employing the dispersed phase volume fractions and concentration of the dispersed phases as boundary conditions on the large scale interface.

This example embodiment, i.e. the one-dimensional slice averaged cross-sectional profile model above, enables explicit coupling with transient quasi three-dimensional (Q3D) or full three-dimensional (3D) models. This is an advantage over conventional transient one-dimensional (1D) multiphase flow models which are unable to provide the spatial distributions of variables such as phase velocities, volume fractions (hold-up), and bubble and droplet sizes, since these variables are simply lumped into closure relations that need to be tuned with the large diameter flow loop and/or field data.

However, there are several flow situations in practical pipelines which are too complex to be modelled adequately by models assuming the flow to be fully developed in time with no axial gradients in velocities and local volume fractions. Thus there is a need for coupling transient 1D-models with Q3D- or 3D-models when applying the models on real pipelines. By using the one-dimensional slice averaged cross-sectional profile model of the example embodiment of the invention, it becomes possible to transform the predicted transient 1D-model results into velocity and phase fraction profiles, which are then used as inlet boundary condition for a transient Q3D-simulation, or a full 3D-flow model. In this way the invention is a key element in explicitly coupling 1D and higher dimensional flow models, such as Q3D-flow models. In this case the dynamic fluid flow predicted by the 1D-models, can flow into a Q3D-pipe where much more flow details can be obtained due to the higher dimensional representation of the flow. This may be done for i.e. a 1D-Q3D or a 1D-3D coupling.

It is also possible to directly couple the output from a Q3D- or 3D-model to the output of a transient 1D-model by means of the 1D-profile model (i.e. the example embodiment of the one-dimensional slice averaged cross-sectional profile model). In both the 1D-Q3D (alternatively 1D-3D) and the Q3D-1D (alternatively 3D-1D) coupling, the models are implicitly coupled at 1D-Q3D (alternatively 1D-3D) and Q3D-1D (alternatively 3D-1D) junctions. In this case the profile model has the same, or similar, physical and numerical description as the transient Q3D-model and when averaged over the entire pipe cross section the distributed field values are related to the cross sectional averaged values used by the 1D-model. When the flow direction at the junction is into the Q3D-domain, the heights (transversal positions) of the interfaces (zone boundaries) and the pressure gradient, provided by the 1D-model, are taken as input to the profile model. The profile model will compute the phase distributions and velocity distributions. Using these distributions an algebraic link between the 1D-model equations and the Q3D-model equations may be created. Finally the method may be used to create an implicit coupling between the 1D-model and the Q3D-model, in which the redistribution coefficients are obtained directly from the profile model. The same method, as described above, may also be used when the flow of either the 1D- or Q3D-model has counter-current flow at a junction. In the other case of unidirectional outflow from a Q3D-domain, Q3D results are simply averaged and are directly coupled to the 1D-model, using up-wind numerical discretization of the quantities transported into the 1D domain.

The method according to the first or second aspect of the invention is well suited for being used to one or more of the following utilisations:

- a tool for improving closure laws in the transient 1D multiphase flow simulators,
- a tool for rapid tuning of closure models in the transient Q3D-model,
- a method for initializing transient Q3D-flow simulations,
- a method for coupling of the transient 1D- and Q3D-flow models for improved accuracy of 1D transient simulation results, and
- a stand alone engineering tool for analyses of pressure drop and phase hold-up, including local velocity profiles and phase distribution.

The invention according to the first or second aspect is well suited when multiphase simulations of 1D- and multi-dimensional (Quasi 3D) are to be coupled. In this case the invention may be used to reconstruct velocity and phase distribution profiles from 1D simulation results, allowing a Quasi-2-dimensional description of the flow. Further, the invention according to the first aspect allows implicitly coupling of multiphase 1D and Q3D simulations. In this case, the algebraic coefficients of the discrete 1D and discrete Q3D equations may be coupled directly inside the equation solver. This possibility allows transient simulations of large pipeline systems with 1D-models, and then used smaller portions with Q3D technology, with higher spatial resolution. In this case the 1D and multi-dimensional models are fully coupled. Also, the invention according to the first aspect has applications in improving the accuracy of the 1D multiphase prediction models for pipe flows. In particular, the distribution slips for dispersed fields can be predicted with this invention. The distribution slip is a result of dispersed phased travelling with local velocities that deviates from the zone averaged velocities.

In a third aspect, the present invention relates to a computer program, comprising processing instructions which causes a computer to perform the method according to the first and/or second aspect of the invention when the instructions are executed by a processing device in the computer. The computer program may in addition to the features defined in first or second aspect of the invention, incorporate any of the additional features, either individually or in any conceivable combination, provided in the description of the first and second aspect of the invention above.

In a fourth aspect, the present invention relates to a computer, comprising a processing device and a computer memory, the computer memory is storing a computer program as described in the third aspect of the invention.

LIST OF FIGURES

FIG. 1 is a schematic representation showing the distribution of the three possible zones with continuous water (bottom), oil (middle) and gas (top). The heavier phase is lower in the general case. Each zone consists of the continuous phase and dispersed fields made up of the remaining present phases. The Large Scale Interfaces (LSIs) separate the individual zones.

Figure 2:
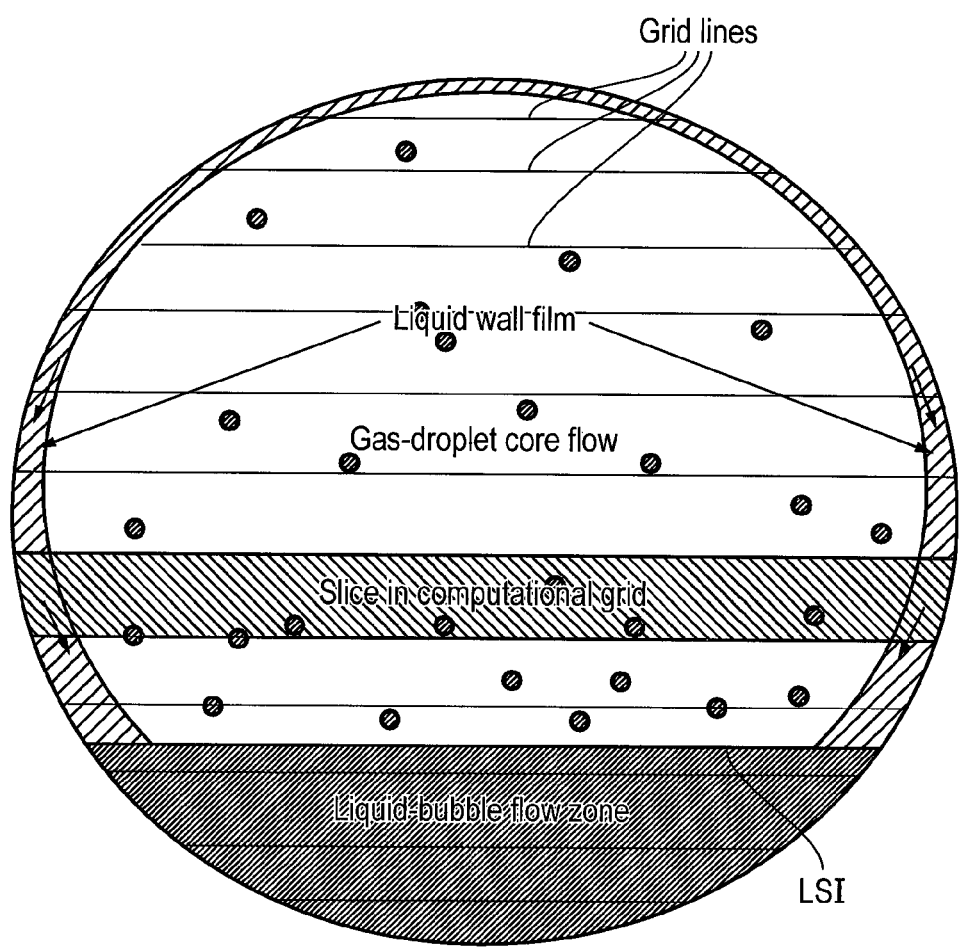

FIG. 2 is a schematic representation showing the slicing (grid cells) and the flow configuration as treated by the method according to the invention for a 2-phase flow. The figure shows one large scale interface (LSI) separating the continuous gas from the continuous liquid phase.

Figure 3:
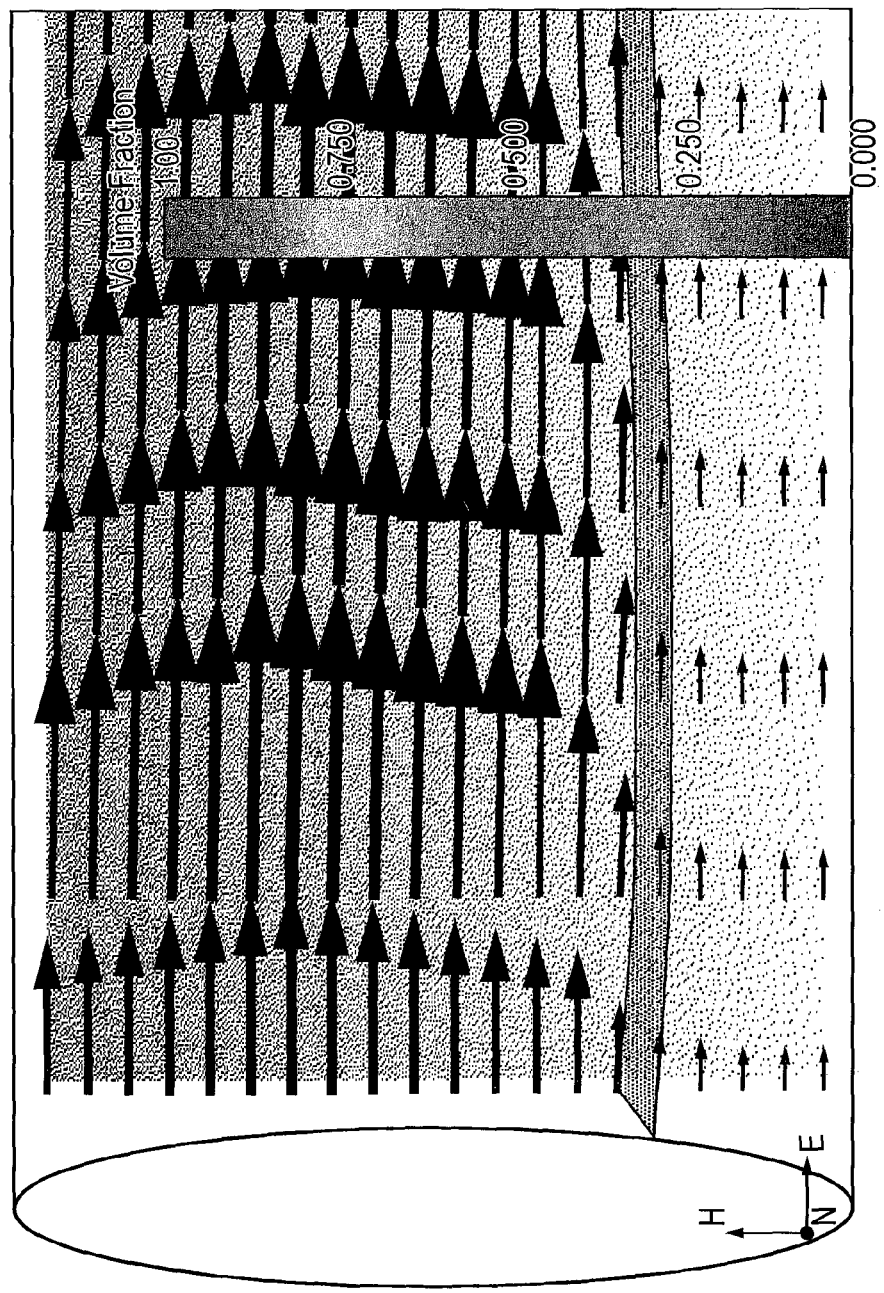

FIG. 3 is a graphical representation of a Q3D-simulation of a pipeline segment illustrating a 1D-Q3D-coupling between an embodiment of the present invention and a conventional Q3D-model. As seen on the figure, the left hand side inflow velocity and volume fraction profiles, obtained by the 1D-profile model of the example embodiment of the invention, are used as inlet boundary conditions for the Q3D-model.

Figure 4:
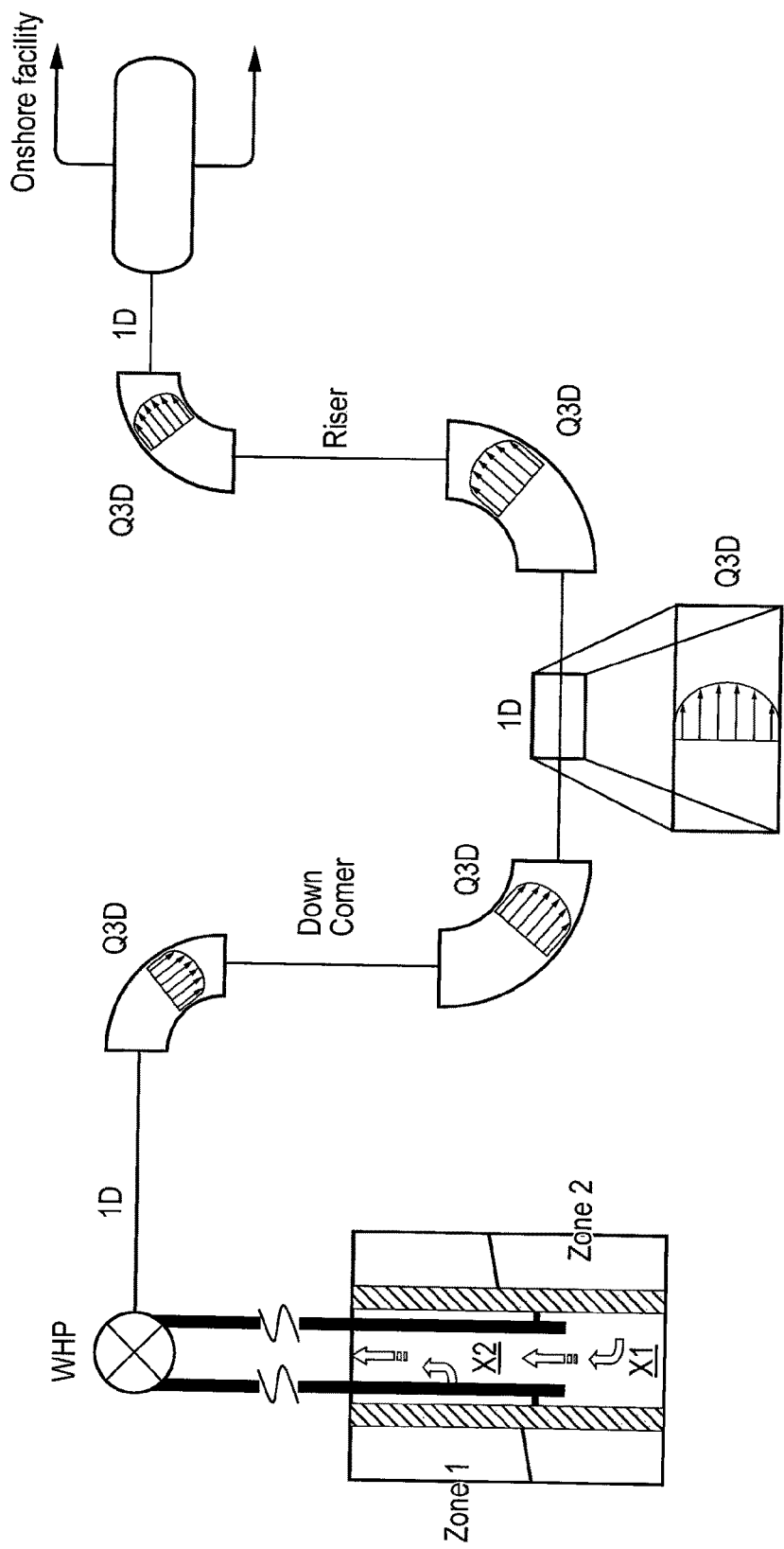

FIG. 4 is a schematic drawing showing an example of a 1D-Q3D-1D coupling between a 1D transient model and conventional Q3D-model of an oil- and gas pipeline from an off-shore well-head platform (WHP) to an on-shore production facility. 1D denotes pipes simulated by the conventional one dimensional transient model and Q3D by the Quasi-3 dimensional conventional flow model. The 1D-profile model of the invention is applied at the junction points between the 1D transient and Q3D to distribute the mass, momentum and energy over slices in the pipe cross section. The figure shows a well (left) with inflow rates X1 and X2, from two separated producing zones 1 and 2.

Figure 5A:
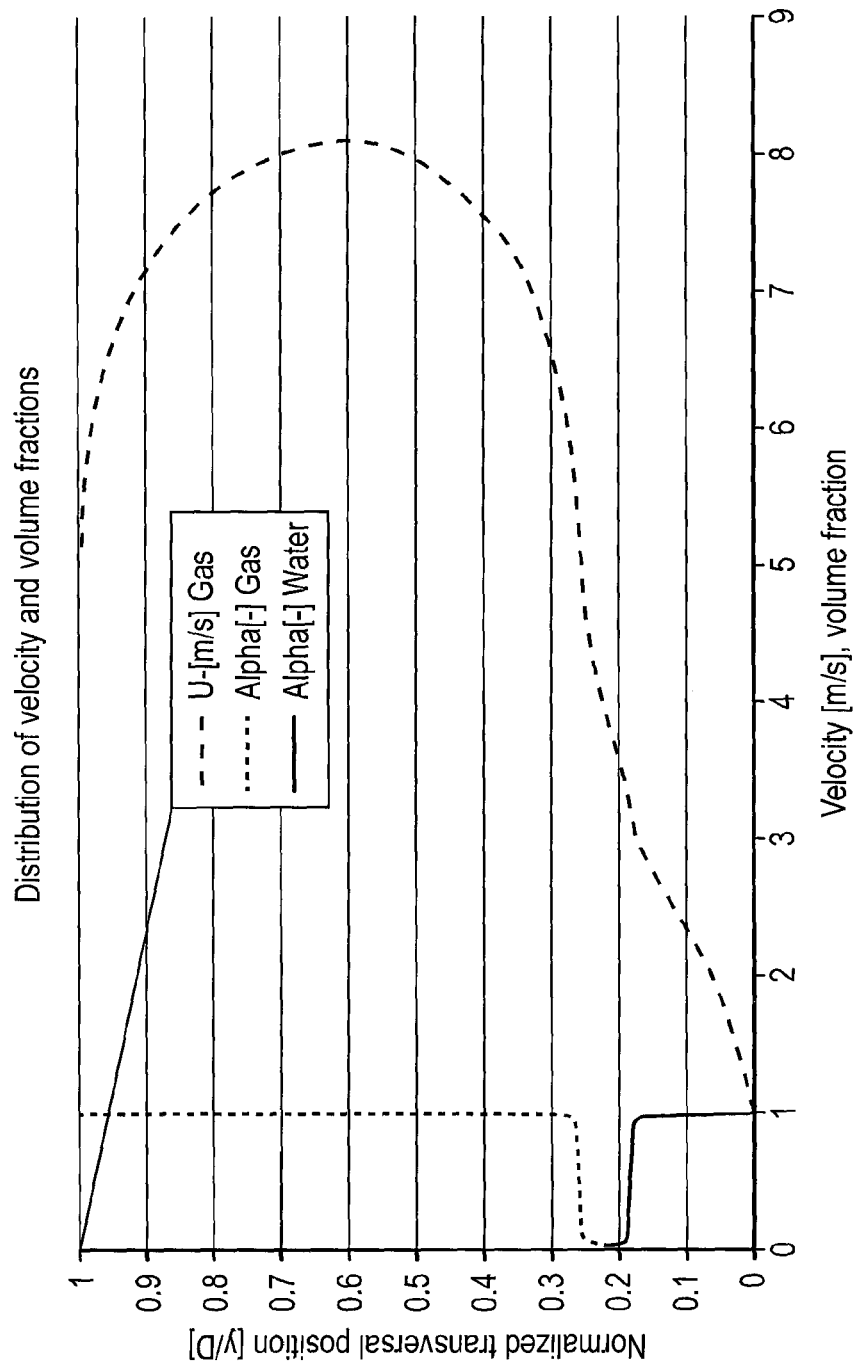
Figure 5B:
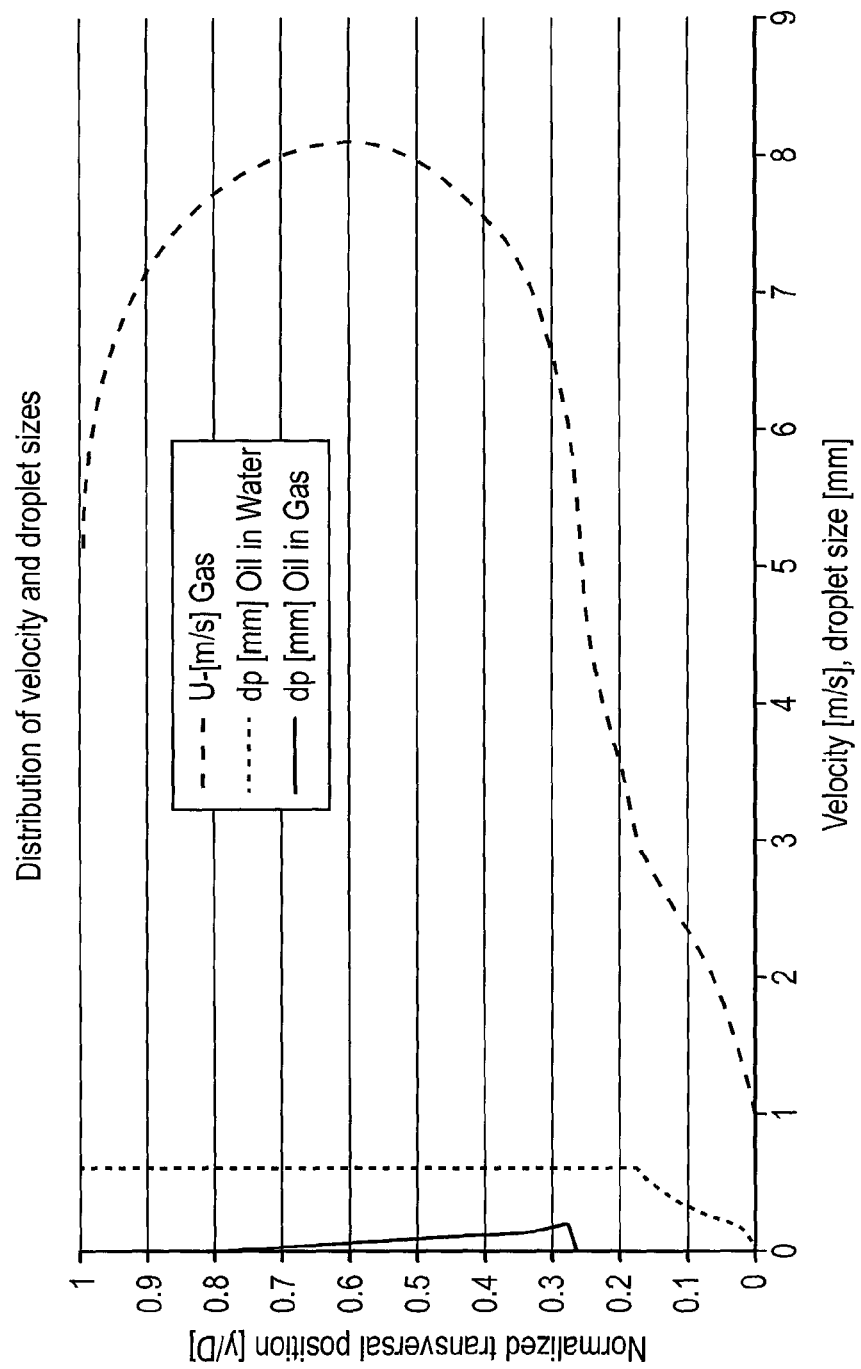

FIGS. 5*a* and 5*b* are graphical representations of predicted phase distributions, phase accumulation and pressure drops in a three-phase fluid pipeline flow in the form of velocity profile and phase volume fraction distributions. In FIG. 5*a*, the blue and red curves show the holdup distributions of water and gas. Oil is not shown, but fills the gap between gas and water. Abscissa values have units that correspond to each type of curve. FIG. 5*b* shows the predicted velocity profile and spatial distribution of the Sauter mean droplet size of "Oil in Gas" and "Oil in Water". Abscissa values have units that correspond to each type of curve.

Figure 6A:
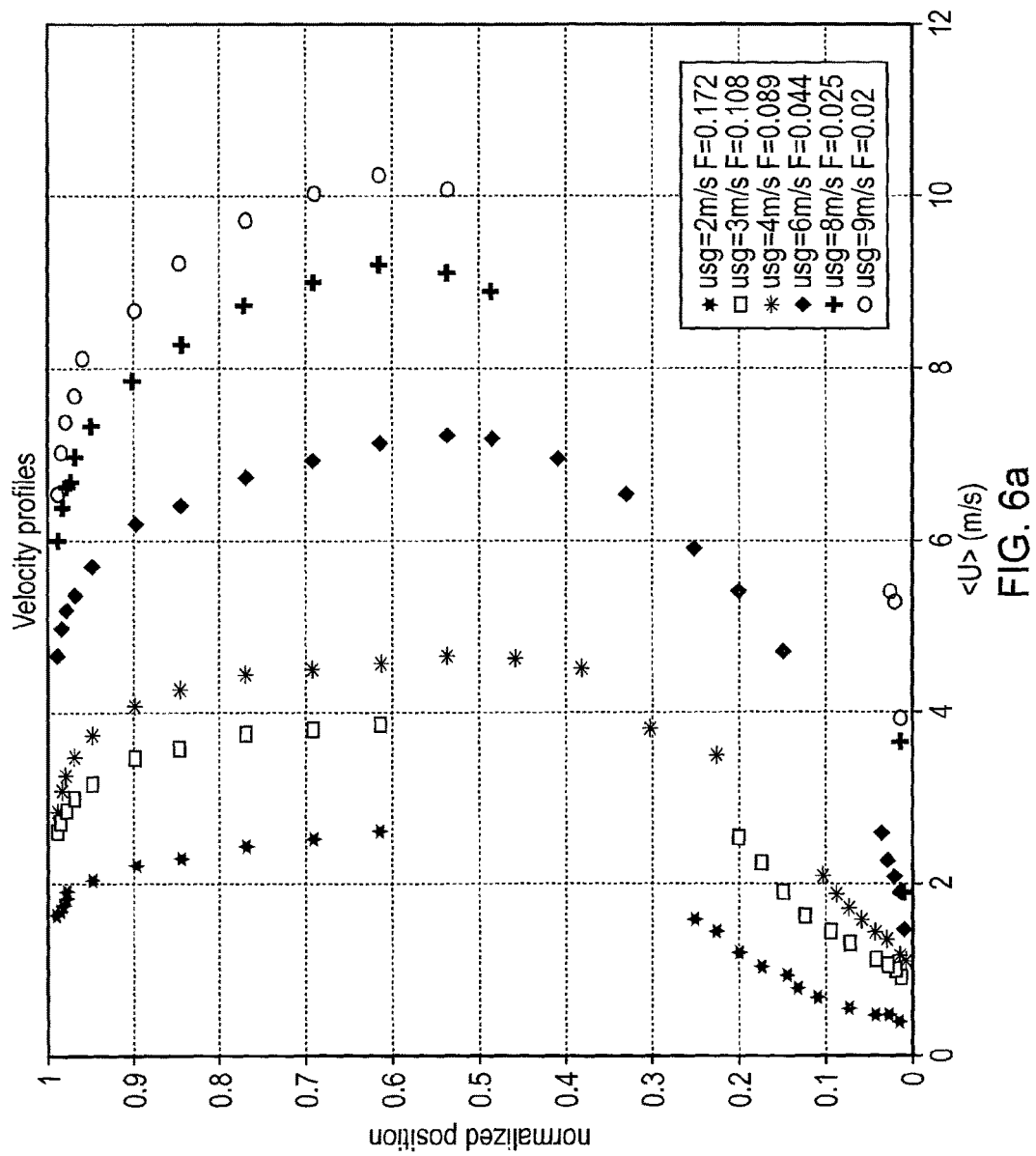
Figure 6B:
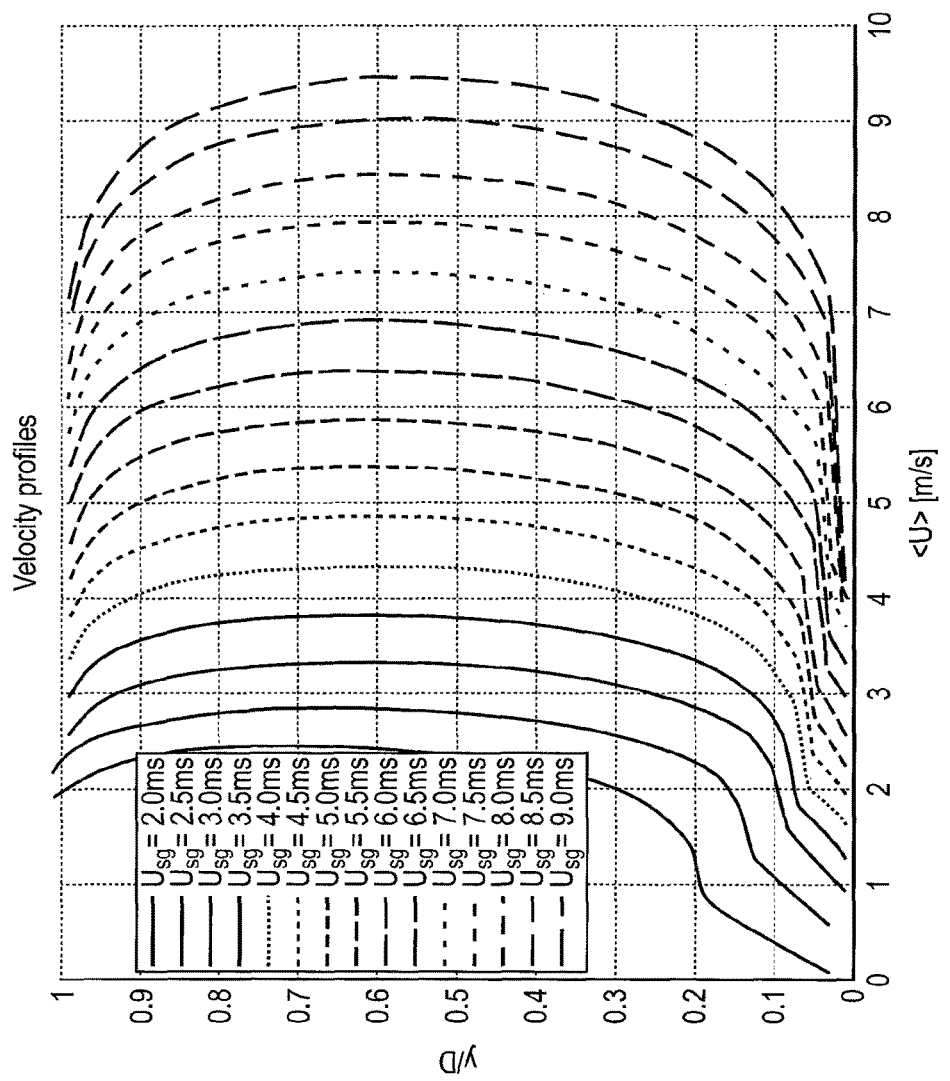

FIGS. 6*a* and 6*b* are graphical representations showing a comparison of experimentally determined velocity profiles (FIG. 6*a*) and velocity profiles predicted by the example embodiment of the invention (FIG. 6*b*).

Figure 7:
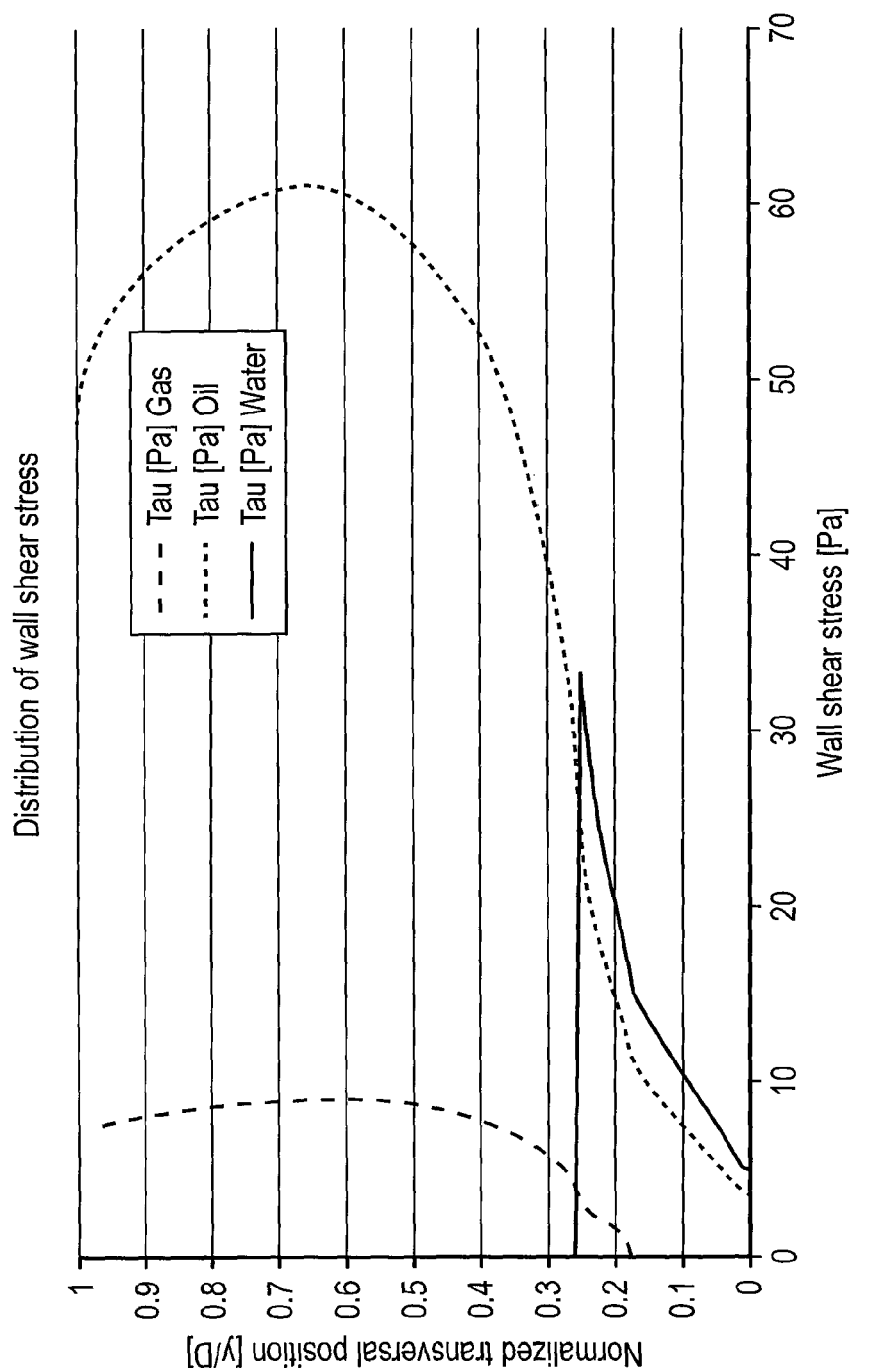

FIG. 7 is a graphical representation showing wall shear stresses exerted by the present phases in a three-phase pipeline flow as predicted by the example embodiment of the invention.

VERIFICATION OF THE INVENTION

The invention will in the next be described in greater detail by way of an example embodiment.
Predicting Multiphase Flow in an Oil and Gas Pipeline The example embodiment is a one-dimensional profile point model approach employing an example embodiment of a one-dimensional profile model which may be interpreted as a sub-set of a Q3D-model, where the spatial dimensions are reduced from 2 to 1 (transversal to the flow direction) and the flow is assumed to be steady or quasi-steady. The example embodiment employs the large scale interface and slice averaging concepts developed for Q3D-models, and is thus a one-dimensional profile model according to the one-dimensional slice averaged cross-sectional profile model embodiment of the invention presented above. See i.e. Laux et al. (2007) for further details.

The multiphase flow within an oil and gas pipeline usually contains a mixture of oil, water and gas. Each fluid is subdivided into several fields, making it possible to distinguish the different physical appearances of one fluid. In this flow there are, as illustrated in FIG. 1, three different continuous phases; water, gas, and oil, and 12 fields; three continuous fields (water, oil, gas), dispersed water in gas, dispersed oil in gas, dispersed gas in water, dispersed gas in oil, dispersed oil in water and dispersed water in oil, liquid oil and water films on the pipe wall in the gas continuous zone, and a gas film on pipe wall in the liquid continuous zones.

The large scale interfaces (LSIs) in this case are the continuous interface separating the water phase from the oil phase, and the continuous interface separating the oil and gas phase as shown in FIG. 1. As in the Q3D-models, the LSIs in this example embodiment are treated as internal dynamic boundaries (constructed and tracked in time), and transport of mass, momentum, and energy at these interfaces are modelled by means of a set of specially designed sub-models. For instance, the mass transfer across the LSI may be described by an algebraic relation between the mass flux on one hand and on the second hand the local distances to the LSI, the interface shear stress, the fluid properties and the molar concentrations on each side of the interface. Similarly, for heat transfer, the heat flux across the LSI may be described by a relation between the heat flux on one hand and on the second hand the local distances to the LSI, the interface shear stress, the fluid properties and the temperatures in the given points at each side of the interface. Finally, the momentum flux (shear stress) across the LSI is described by a relation between the momentum flux on one hand and on the second hand the local distances to the LSI, the interface shear stress, the fluid properties and the velocities in the given points at each side of the interface. The latter approach for the turbulent shear stress at the LSIs, also known as the application of wall functions [3], is including the effect of interfacial waves, using the wall functions and interface wave roughness [4] from both sides of the interface. The LSIs of this embodiment are ensemble averaged interfaces separating flow zones with different continuous fluids.

The reduction of the mathematical description from 2D to 1D is obtained by the concept of slice averaging. The slices are produced by slicing the pipe cross section in a transversal direction, in the direction of gravity, to form a set of stratified grid cells covering the entire cross-section of the pipeline as indicated in FIG. 2 (which illustrates a two-phase flow of natural gas and condensate). The developed 2D multiphase flow equations in each slice is averaged to arrive at flow conservation equations which only depend on the transversal direction, allowing discrete model equations to be formulated. In this way a set of one-dimensional transport equations is obtained and which is closed by supplying an additional set of closure terms for modelling the fluxes acting on the side wall of the pipe. These fluxes, such as wall shear stress and production of turbulent kinetic energy, are derived and calculated locally at each grid cell across the pipe, from the bottom to the top wall. Using this concept, gradients of the solved field variables are allowed in the transversal direction, in the direction of gravity (with respect to the pipeline). This approach will dramatically reduce the computational time to obtain a developed flow solution of a 3D-flow. By this basically one-dimensional approach, it becomes possible to do fast simulations of a wide range of flow configurations.

In practice, the formation of the numerical one-dimensional profile point model of this example embodiment may be obtained by the following procedure:

1) The pipe cross section is divided into discrete areas or computational cells by dividing the cross-section into slices in one horizontally oriented spatial direction, in which the discrete slice areas fill the entire pipe cross section.
2) The concept of large scale interface is introduced in order to handle the physical processes taking place at the interfaces between continuous zones (main gas-liquid interface in two phase flows) by positioning the LSIs (oil-gas and water-oil) into the pipe geometry. The LSI positions are assumed known and are placed as a geometrical input to the flow.
3) The flow may either be assumed steady and fully developed, in which all transient terms and axial (in the direction of the fluid flow) field gradients disappear, or it may be assumed quasi-steady and not fully developed, in which both the transient, the convective terms and the gravity terms are averaged over the pipe cross section and averaged values are defined for each zone comprising one continuous fluid. These zone averaged values are used as explicit momentum sources for the momentum equations. In this way the shear stresses and shear stress like terms are solved on the pipe cross section (profile) while the cross-sectional averaged transient terms, convection terms and axial gravity driven terms are explicit and constant within each zone.
4) The multiphase flow equations for one continuous field and several dispersed fields are described by Eulerian formulated transport equations which are averaged over the width of the slices. The field variables in each slice can now be coupled to the wall values (such as wall temperature) and the values in the neighbouring slice. In slices, which are not interfering with a large scale interface (LSI), the model description is complete.
5) When a LSI falls exactly on a grid line between two cells, the fluxes of mass (deposition and entrainment), momentum and energy are related directly to the grid values of the fields. The fluxes across the LSI are computed by employing standard wall functions, and the fluxes are related to the field variable on each side of the LSI. For the dispersed phase volume fractions, the concentration of the dispersed phases at each side of the LSI is given as a separate boundary condition (BC).
6) In most cases 5) is not fulfilled, and the LSI position is imposed on the grid in order to represent a given volume fractions of the zones. When a LSI does not fall exactly on a grid line between two cells, it may be used either of two alternatives: The grid line closest to the LSI is moved exactly to the LSI and the grid point positions are adjusted to the centre of the adjacent grid cells, or a grid line is aligned accurately with the LSI and the remaining grid lines are redistributed to have a smooth grid with similar cell height on each side of the LSI.
7) The discrete dispersed and continuous field conservation equations for each phase are now added together to make final phase transport equations.
8) The discrete representations of the transport equations are solved numerically on the mesh described in 1), 5) and 6). The transport equations comprise conservation of mass, momentum, turbulence fields, energy and size of the dispersed phase phases.
9) The solution in 8) is based on given LSI positions and pressure gradient and the overall result from this calculation is the superficial velocities or mass flow rates of all present phases.
10) The solution, for a given set of superficial velocities, may be obtained by Newton's method. i) The Jacobian of the relation between zone fraction and pressure gradient, and the superficial phase velocities, are found by numerical perturbation of the pressure gradient and zone fractions. ii) For each perturbation value the profile model must be solved to give the corresponding and resulting superficial velocities. iii) When the Jacobian matrix has been determined from the perturbation, a linear algebraic equation set is formed, relating the target superficial velocities to the fluid zone fractions (LSI positions), the pressure gradient and the resulting superficial velocities from the example embodiment (profile model). iv) The equation set is next solved to find the new fluid zone fractions and pressure gradient. v) The profile model of the example embodiment is run with the new pressure gradient and zone fractions. If the phase superficial velocities differ from the target value, go back to step i) above and do one more iteration. vi) Iterate the steps i) to v) until arriving at the wanted superficial phase velocities. The result of this procedure is that that it becomes possible to determine the pressure drop and holdup for a given set of superficial velocities.

The described method can be applied as a stand alone prediction tool to predict phase distributions, phase holdup, velocity profiles and pressure drop for fluids with known rheology and physical properties.

The example embodiment is a 1D (one dimensional) simulator of multiphase pipeline flows which is suited for direct coupling of 1D transient models to Quasi-3D models (of full 3D-models) for transient multiphase pipe flow (1D-Q3D, 1D-Q3D-1D) as described above. An example of a 1D-Q3D coupling is illustrated in FIG. 3, which shows an example of calculated fluid phase velocities and the LSI-positions by a Q3D-model for a set of grid cells representing segment of a pipeline two-phase flow. The LSI-positions and axial pressure gradient at the upstream (left side) area of the pipe segment is determined by the 1D transient model, where profiles of field velocities and dispersed phase volume fractions are produced by the example embodiment and continuously provided to the Q3D-model as inlet boundary values at the upstream side. A similar direct coupling by employing the fluid phase velocities, LSI-position, axial pressure gradient from a Q3D- or 3D-model may be employed as inlet boundary values to the 1D-model of the example embodiment may also be applied.

In this way, the 1D-profile model of the invention may be employed together with a 1D transient model and a conventional Q3D- or 3D-model to simulate i.e. the multidimensional flow in an oil and gas pipeline from an offshore wellhead platform to an onshore production. An example of such 1D-Q3D-1D coupling is given in FIG. 4. Along the flow path, from well to processing facility, most of the pipeline is simulated by the 1D transient model. However, at critical locations such as bends, the flow is simulated by the Q3D-model for improved accuracy. In this case, at the junction points between 1D transient and Q3D, the profile model solution is used to distribute the mass, momentum and energy over slices in the pipe cross section. The sliced grid over the pipe cross section is shared by the profile model and the Q3D-model. The one-dimensional profile model approach according to the first aspect of the invention is here the key element to directly couple the 1D transient flow solution to the Q3D flow solution.

EXAMPLES OF APPLICATION OF THE EXAMPLE EMBODIMENT OF THE INVENTION

The invention is well suited for pipeline type flows in the oil and gas industry, and may be applied for local analyses of stationary, developed flow phenomena. In addition, the invention can take prediction results from a 1D-transient flow model and interpret spatial distributions such as the phase distribution and velocity profiles. In this way the invention can be used as a magnifying glass into the flow predicted by a 1D-multiphase flow model.

Example 1

Using the example embodiment of the invention as a stand alone tool to predict phase distributions, phase accumulation and pressure drops during pipeline transportation of fluids is presented in FIGS. 5a and 5b.

The pipe has a diameter of 0.189 m, wall roughness is 20 micrometer, densities are 103 (gas), 700 (oil) and 1000 kg/m$^3$ (water), viscosities are 0.000015 (gas), 0.00077 (oil) and 0.001 Pa s (water), and surface tensions are 0.021 (gas-oil), 0.072 (gas-water) and 0.034 N/m (oil-water). The pipe is slightly inclined upwards, with inclination relative to horizontal of 1°. The superficial velocities of gas, oil, and water are 6.0, 0.3 and 0.3 m/s, respectively. As can be[e] seen from FIG. 5a, the example embodiment of the invention returns in this case gas, oil and water holdups of 0.71, 0.14 and 0.15, respectively, while the predicted pressure gradient is −88 Pa/m. The predicted spatial distribution volume fractions of gas and water are shown in the figure, while oil exists in the layer between gas and water. FIG. 5a show that the oil-water LSI is located at relative position 0.18 and the gas-oil LSI at relative position 0.26. FIG. 5b shows the Sauter mean size of oil droplets in water (Oil-In-Water) and water droplets in oil (Water-In-Oil). The gas velocity profile represents the gas phase velocities, which is the continuous gas velocities above position 0.26, the bubble in oil velocity for positions between 0.18 and 0.26, and the bubble in water velocity below position 0.18.

Example 2

This example shows use of the example embodiment of the invention as a stand alone support tool, i.e. the 1D-point model approach, for providing flow information useful in designing and/or operation of oil and gas pipelines.

FIGS. 6a and 6b is a comparison of experimentally determined velocity profiles and predicted velocity profiles from the example embodiment of the invention. FIG. 6a illustrates graphs of experimentally determined velocity profiles for a set of two-phase flows where the liquid flow velocity is kept constant and the gas flow rate is varied. FIG. 6b provides a similar graphic representation of the same set of two-phase flows as predicted from the example embodiment of the invention. As can bee seen from the figures, the profile model of the example embodiment can closely represent the actual velocity profile and support operators or engineers in making decisions where local flow information is needed.

Example 3

Using the example embodiment of the invention as a stand alone tool for direct engineering analyses. Based on flow rates, fluid properties, diameter and pipe inclination, pressure drop and liquid accumulation are reported. Profile information, including distribution of droplet mass over the pipe cross section, is available for flow assurance assessments.

The example embodiment of the invention may i.e. give distributions of local shear stresses, wall temperatures, heat transfer coefficients and mass transfer coefficients, all along the periphery of the pipe. The wall shear stresses are available from the hydrodynamic calculation. By adding a homogeneous heat source or mass source to the flow, steady state solutions for the energy and mass equations are found. The slice averaged temperatures and concentrations are related to the local heat and mass fluxes by the aid of specially designed wall functions. In this way local heat transfer coefficients, between bulk flow and pipe wall, and between the fluids sharing a LSI, are computed. These heat transfer coefficients can be used to enhance the performance of 1D transient flow codes. Similarly, this is done for mass transfer of particles (scale, wax, hydrates, asphalthenes) to the pipe wall, and for mass exchange of chemical components across the LSI. These predictions can be used to assess potentials of water condensation, particle deposition and corrosion. An example of this application is seen in FIG. 7, where the wall shear stresses exerted by the present phases is shown. In the gas dominated region the oil droplets exert a significant shear stress, larger than for the gas, due to their large density and inertia.

DEFINITION OF TERMS USED IN THE APPLICATION

As used herein, the meaning of the following terms are defined to be:
- "axial" means in a direction parallel with the centre axis of the pipeline (direction of the fluid flow),
- "continuous fluid phase" is a phase in which droplets, bubbles, and particles are dispersed. In i.e. a multiphase flow of water, oil, and natural gas, each of these will form a stratified continuous phase separated by a large scale interface,
- "Eulerian transport equation" is a partial differential equation expressing the conservation law for a given variable in a fixed coordinate system,
- "explicit coupling" means that the outflow from one pipe is injected into another pipe, only by sequentially updating the inflow values for pipe 2 with the outflow values for pipe 1. The inflow pressure for pipe 2 is coupled directly to the outflow pressure for pipe 1, "field" is used to describe the physical appearance of a phase. The water may i.e. be present in the multiphase as the following fields; water droplet in gas, water droplet in oil, continuous water phase, water condensate film at pipe wall etc., "flow geometry values" means the values representing the physical distribution and properties of the fluid phases in the pipeline, and usually includes at least the location of the large scale interfaces, "horizontal" is used in relation to the earth gravity field, such that a horizontal plane is oriented normal to the direction of the earth gravity field, "large scale interface" means the interface between two continuous phase regions in the multiphase flow, "pipe inclination angle" means the angle between the centre axis of the pipeline and the horizontal plane, "one-dimensional model" means any 1D Eulerian transport equation based numerical model which determines the flow from a given set of flow geometry values, "one-dimensional profile model" is the specific one-dimensional slice averaged cross-sectional model employed in the example embodiment of the present invention, "one-dimensional point model" any 1D Eulerian transport equation based numerical model including the numerical perturbation of the flow geometry values and the Jacobi-matrix to refine the flow parameters and thus allowing determination of the pressure drop and hold-up (determination of LSI-positions) from the real world superficial velocities, "one-dimensional profile point model" is the specific one-dimensional slice averaged cross-sectional model employed in the example embodiment of the present invention and which includes the numerical perturbation of the flow geometry values and the Jacobi-matrix to refine the flow parameters and thus allowing determination of the pressure drop and hold-up (determination of LSI-positions) from the real world superficial velocities, "quasi 3-dimensional model" means a full three-dimensional multiphase flow model which is averaged over one transverse direction to simulate transient multiphase flows in pipelines on a two-dimensional computational mesh, "quasi-steady" means a snap shot of a transient flow in the sense that the transient, convective terms and other axial gradients are assumed "frozen", "superficial velocity of a fluid phase" means the flow velocity the fluid phase would have in the pipeline if it was the only fluid phase present. That is, the superficial velocity is the flow volume rate divided with the pipe cross-sectional area, "stratified layers of the continuous fluid phases" means that the fluid phases of the multiphase flow are assumed overlaid each other in the pipeline in horizontally oriented layers, "up-winding" means that a cell face value of a field is computed from the value of the field at the upstream side of the cell face, "zone" means a three-dimensional region which has a common fluid as the continuous phase and where all other phases inside the region is dispersed.

REFERENCES

1. H. Laux, E. A. Meese, S. Mo, S. T. Johansen, K. M. Bansal, T. J. Danielson, A. Goldszal, and J. I. Monsen (2005), Multi-dimensional simulations of slug and slug-like flows in inclined pipes and channels, 6th North American BHRG Conference on Multiphase Technology, Jun. 12, 2005, Banff, pp. 21-36
2. Laux et al. (2007), "Simulation of multiphase flows composed of large scale interfaces and dispersed fields", $6^{th}$ International Conference on Multiphase Flow, ICMF 200, Leipzig, Germany, July 9-13, Paper No S5_Tue_D_29.
3. A. Ashrafian & S. T. Johansen ((2007), Wall boundary conditions for rough walls, Progress in Computational Fluid Dynamics, 7, pp. 230-236
4. H. Charnock (1955), Wind stress on water surface. Quart. J. Roy. Meteor. Soc., 81, 639-640.

The invention claimed is:

1. A method for regulating the operation of a pipeline containing a multiphase flow, where the multiphase flow comprises a plurality of stratified continuous fluid phases separated by large scale interfaces, wherein the method comprises:

providing a computer readable storage medium having instructions stored thereon which, when executed, cause a computer to determine flow parameters providing information on the flow velocities, pressure variations and fluid temperatures in the multiphase flow, by the following numerical simulation:

a) providing estimated or measured input values describing the pipe diameter and the inclination angle of the pipeline relative to the horizontal plane, b) providing estimated or measured input values describing the axial pressure gradient and the flow geometry of the multiphase flow, where the estimated or measured input values of the flow geometry at least comprises the positions of the large scale interfaces separating the continuous fluid phases, c) employing a numerical model based on Eulerian formulated transport equations of the multiphase flow over a vertical cross-section of the pipeline, wherein employing the numerical model further comprises:

c1) dividing the cross-section area of the pipeline into a number of n discrete horizontally oriented slices by defining a set of n−1 horizontally oriented parallel grid lines spaced a vertical distance apart from each other, where n is an integer from 2 to 1000;

c2) defining the position of the nearest lying grid line of each of the large scale interfaces to be the same as the position of the respective large scale interface;

c3) defining, for each of the n slices, a set of ensemble averaged two-dimensional Eulerian formulated transport equations for conservation of mass, momentum, turbulence fields, energy, and size of the dispersed field phases for both the continuous phase and each dispersed field in the continuous phase of the n'th slice;

c4) averaging the two-dimensional Eulerian formulated transport equations for each of the n slices in horizontal direction over the width of the n'th slice to provide one-dimensional Eulerian formulated transport equations for each of the n slices, and c5) closing the one-dimensional Eulerian formulated transport equations by coupling field values for each of the n slices to pipeline wall boundary conditions and the value of the corresponding field value of the neighbouring slice, determining, for each of the large scale interfaces, the fluxes of mass, momentum and energy across the large scale interface by employing standard wall functions and relating these fluxes to the field values of the slices on both sides of the large scale interface, and employing the dispersed phase volume fractions and concentration of the dispersed phases as boundary conditions on the large scale interface; and d) solving the numerical model with the set of input values from step a) and b) to determine field superficial velocities and one or more other of the flow parameters of the multiphase flow selected from of the list consisting of; profiles of phase- and field velocities, profiles of phase- and field volume fractions, profiles of field droplet- and bubble sizes, and phase- superficial velocities, wherein the method further comprises regulating the operation of the pipeline by feeding into the pipeline measured flow volumes of each of the continuous fluid phases which are proportional to the field superficial velocities determined in step d);

and wherein the method further comprises the additional steps in successive order:

d1) providing real world values of the superficial velocities of each of the fluid phases, d2) employing numerical perturbation on the axial pressure gradient and the flow geometry values of the multiphase flow from step b) to form a set of numerically perturbed input values, d3) solving the numerical model by performing step c) and d) with the input values from step a) and each of the numerically perturbed input values in the set of step d2) to obtain a set of virtual superficial velocities, d4) forming a Jacobian matrix from the set of numerically perturbed input values of step d2) and the set of virtual superficial velocities from step d3), and employing the Jacobian matrix to determine the relationship between the numerically perturbed input values and superficial velocities of the fluid phases, d5) employing the determined relationship from step d4) to determine the specific axial pressure gradient and flow geometry values which correspond to the real world values of the superficial velocities from step d1), and d6) employing the specific axial pressure gradient and flow geometry values from step d5) as input values in step b) and then performing step c) and d).

2. A method according to claim 1, wherein the method further comprises inserting after step d6) the additional steps of:

d6-1) comparing the estimate of the real world superficial velocities obtained in step d6) with the provided real world values of the superficial velocities from step d1) and determine the absolute value of the difference between them, and d6-2) compare the absolute value of the difference from step d6-1) with a predetermined cut-off criteria, and if the difference between the estimated and provided real world values of the superficial velocities are larger than the cut-off criteria, set the obtained flow geometry values and axial pressure gradient from step d5) as new initial values of the flow geometry and repeat steps c) to d6-1), or if the difference between the estimated and provided real world values of the superficial velocities is smaller than the cut-off criteria, proceed to step e).

3. A method according to claim 1, wherein the characteristic fluid flow parameters also include one or more of the following parameters; fluid volume fractions, heat- and mass transfer coefficients, averaged particle or bubble sizes, wall shear stresses.

4. A method according to claim 1, wherein the input values describing the flow geometry of the multiphase flow further comprises initial values of the turbulence fields and dispersed field sizes.

5. A method according to claim 1, wherein input values representing the real world superficial velocities is based on measurements of the volume flow rate of each of the fluid phases in the pipeline.

6. A method according to claim 1, wherein the determined flow parameters are transmitted to a displaying device for visual representation, a computer data storage device, or transmitted to a computer memory device, or a combination of these.

7. A method according to claim 1, wherein the method is applied to predict one or more of the following flow parameters for the individual phases and fields of the multiphase flow; wall shear stresses, volume fractions, droplet sizes, bubble sizes, turbulent energy, turbulent length scales, heat transfer coefficients, and mass transfer coefficients.

8. A method according to claim 1, wherein the method is applied to predict velocity and phase fraction profiles of the multiphase flow, and then employ the velocity and phase fraction profiles as boundary conditions in either a transient quasi three-dimensional model or a full three-dimensional flow model for determining the flow parameters of a multiphase flow in a pipeline.

9. A method according to claim 1, wherein the input values describing the axial pressure gradient and the flow geometry of the multiphase flow are obtained from a one-dimensional transient model, and where output from the profile model may optionally be returned to the one-dimensional transient model in order to improve its prediction accuracy.

10. A method according to claim 1, wherein the numerical model is a one-dimensional model or a quasi-two-dimensional model formed by setting up a two-dimensional description of the flow through a cross-sectional slice and averaging over the cross-sectional slice.

11. A method according to claim 10, wherein the method:
after dividing the cross-section area of the pipeline into a number of n discrete horizontally oriented slices by defining a set of n−1 horizontally oriented parallel grid lines spaced a vertical distance apart from each other, where n is an integer from 2 to 1000, and defining the position of the nearest lying grid line of each of the large scale interfaces to be the same as the position of the respective large scale interface,
further involves:
determining the distances to the pipeline wall being applied in the computation of the wall shear stresses in the Eulerian formulated transport equations by the method of claim 10 for each of the discrete horizontally oriented slices.

12. A method according to claim 1, wherein the numerical model in step c) further comprises determining the distances to the pipeline wall for each stratified continuous fluid phase of the multiphase flow being applied in the numerical computations by:
employing an estimated or measured wall shear stress value and the wall function to determine the velocity profile for each of the stratified continuous fluid phases across the vertical cross-section of the pipeline,
determining an averaged flow velocity for each of the stratified continuous fluid phases across the vertical cross-section of the pipeline by integration over the cross-sectional area of the stratified continuous fluid phase, and applying the averaged flow velocity for each of the stratified continuous fluid phases and the wall function to determine the distance to the wall being applied in the computation of the wall shear stresses in the Eulerian formulated transport equations for each of the stratified continuous fluid phases.

13. A method according to claim 1, wherein the method is applied for one of the following;
  trouble-shooting during operation of a pipeline with a multiphase fluid flow,
  using holdups and pressure drops from standard zero-dimensional multiphase point models as input, and thereby obtaining information about droplet wetting of the top of the pipe and the liquid water, or
  being implemented in or coupled to other numerical models for determining fluid flows in pipelines.

* * * * *